(12) United States Patent
Barker

(10) Patent No.: US 11,737,530 B2
(45) Date of Patent: Aug. 29, 2023

(54) BIRD FEEDER UMBRELLA ASSEMBLY

(71) Applicant: Troy Barker, Salem, OR (US)

(72) Inventor: Troy Barker, Salem, OR (US)

( * ) Notice: Subject to any disclaimer, the term of this patent is extended or adjusted under 35 U.S.C. 154(b) by 337 days.

(21) Appl. No.: 17/123,922

(22) Filed: Dec. 16, 2020

(65) Prior Publication Data

US 2022/0183430 A1 Jun. 16, 2022

(51) Int. Cl.
*A01K 39/01* (2006.01)
*A45B 23/00* (2006.01)

(52) U.S. Cl.
CPC .............. *A45B 23/00* (2013.01); *A01K 39/01* (2013.01); *A45B 2023/0012* (2013.01); *A45B 2200/1009* (2013.01)

(58) Field of Classification Search
CPC .............. A01K 39/01; A45B 1/00; A45B 1/04
See application file for complete search history.

(56) References Cited

U.S. PATENT DOCUMENTS

| | | | | |
|---|---|---|---|---|
| 3,285,554 | A * | 11/1966 | Voelkerding | E01F 9/685 248/156 |
| 5,161,561 | A * | 11/1992 | Jamieson | A45B 23/00 248/156 |
| 5,878,762 | A * | 3/1999 | Huang | A45B 23/00 248/122.1 |
| D452,048 | S | 12/2001 | Colwell | |
| 6,443,172 | B2 * | 9/2002 | Brumfield | A45B 1/00 248/539 |
| 6,539,892 | B1 | 4/2003 | Bescherer | |
| 6,575,417 | B1 * | 6/2003 | Krommenakker | A47G 23/0225 248/156 |
| D477,458 | S | 7/2003 | Goldwitz | |
| 6,675,819 | B2 * | 1/2004 | Arrowood | A45F 3/44 248/156 |
| 6,932,023 | B1 | 8/2005 | Nauert | |
| 7,162,975 | B1 | 1/2007 | Nauert | |
| 9,554,630 | B1 * | 1/2017 | Patel | A45B 25/18 |
| 10,271,525 | B2 | 4/2019 | Colvin | |
| 2003/0173474 | A1 * | 9/2003 | Taylor | A45F 3/44 248/156 |
| 2007/0137681 | A1 * | 6/2007 | Tatz | A45B 3/06 135/98 |
| 2010/0175627 | A1 * | 7/2010 | Carpenter | A61L 2/16 424/618 |
| 2011/0073043 | A1 | 3/2011 | Dault | |

FOREIGN PATENT DOCUMENTS

WO WO2009152090 12/2009

* cited by examiner

*Primary Examiner* — Noah Chandler Hawk

(57) ABSTRACT

A bird feeder umbrella assembly for keeping bird seed in a bird feeder dry includes a pole that includes a first portion which slidably engages a second portion. A support foot is coupled to the pole to engage the ground for retaining the pole in a vertical orientation when the pole is inserted into the ground. A plurality of hooks is each coupled to and extends laterally away from the pole. A sleeve is coupled to the pole and the sleeve is aligned with the pole. A bird feeder is removably suspended from a respective one of the hooks for feeding birds. An umbrella is insertable into the sleeve having the umbrella extending over each of the hooks to protect the bird feeder from precipitation thereby inhibiting the bird feed from getting wet.

1 Claim, 6 Drawing Sheets

BIRD FEEDER UMBRELLA ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to umbrella devices and more particularly pertains to a new umbrella device for keeping bird seed in a bird feeder dry. The umbrella device includes a plurality of hooks for hanging a bird feeder beneath an umbrella.

(2) Description of Related Art Including Information Disclosed Under 37 CFR 1.97 and 1.98

The prior art relates to umbrella devices including a variety of bird feeder devices that include a dome-like cover for keeping bird seed dry. In at least one instance the dome-like cover includes mechanisms of an umbrella canopy. In no instance is a pole disclosed that has a sleeve for an umbrella rod and which includes hooks for suspending a bird feeder.

BRIEF SUMMARY OF THE INVENTION

An embodiment of the disclosure meets the needs presented above by generally comprising a pole that includes a first portion which slidably engages a second portion. A support foot is coupled to the pole to engage the ground for retaining the pole in a vertical orientation when the pole is inserted into the ground. A plurality of hooks is each coupled to and extends laterally away from the pole. A sleeve is coupled to the pole and the sleeve is aligned with the pole. A bird feeder is removably suspended from a respective one of the hooks for feeding birds. An umbrella is insertable into the sleeve having the umbrella extending over each of the hooks to protect the bird feeder from precipitation thereby inhibiting the bird feed from getting wet.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
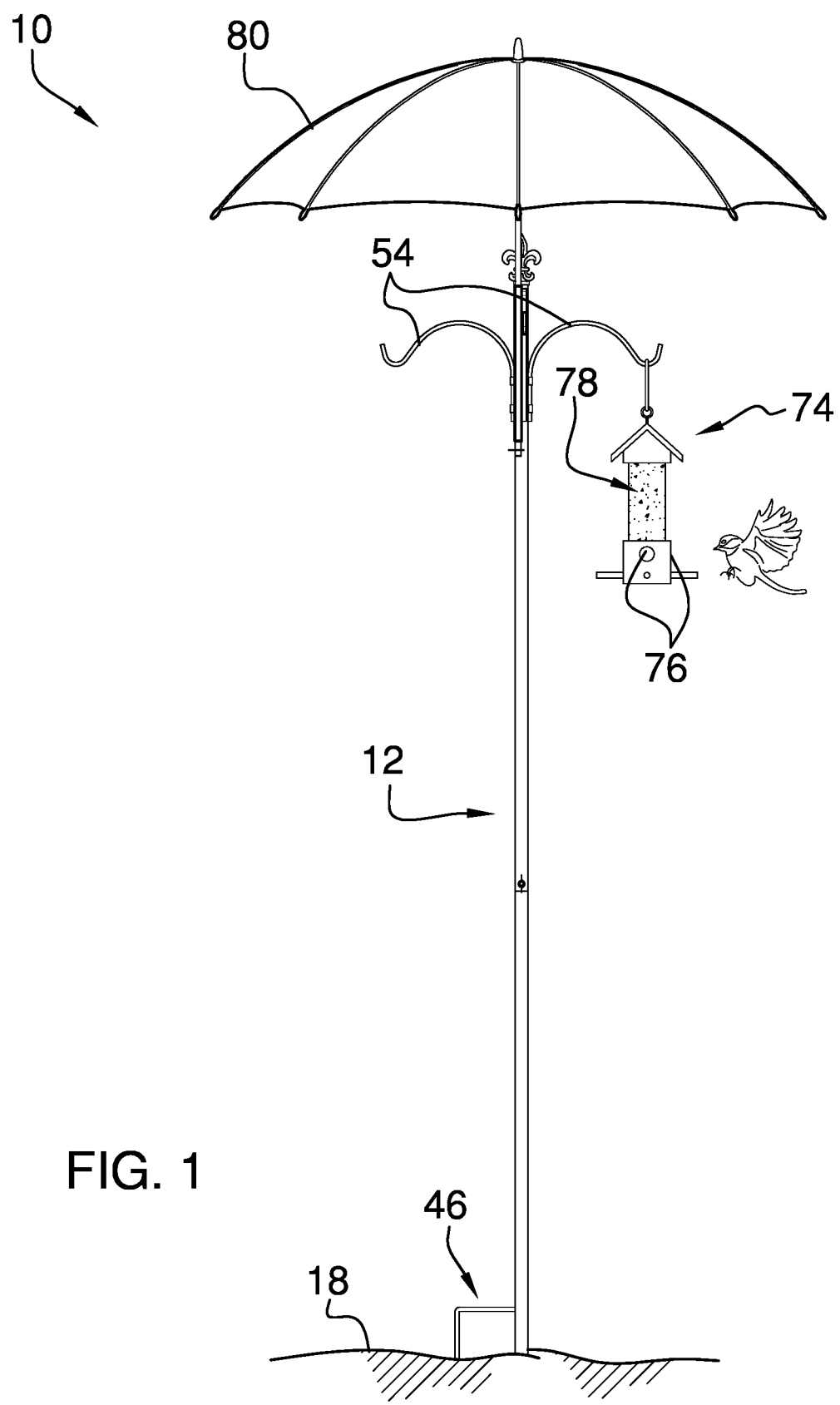
FIG. 1 is a perspective in-use view of a bird feeder umbrella assembly according to an embodiment of the disclosure.
Figure 2:
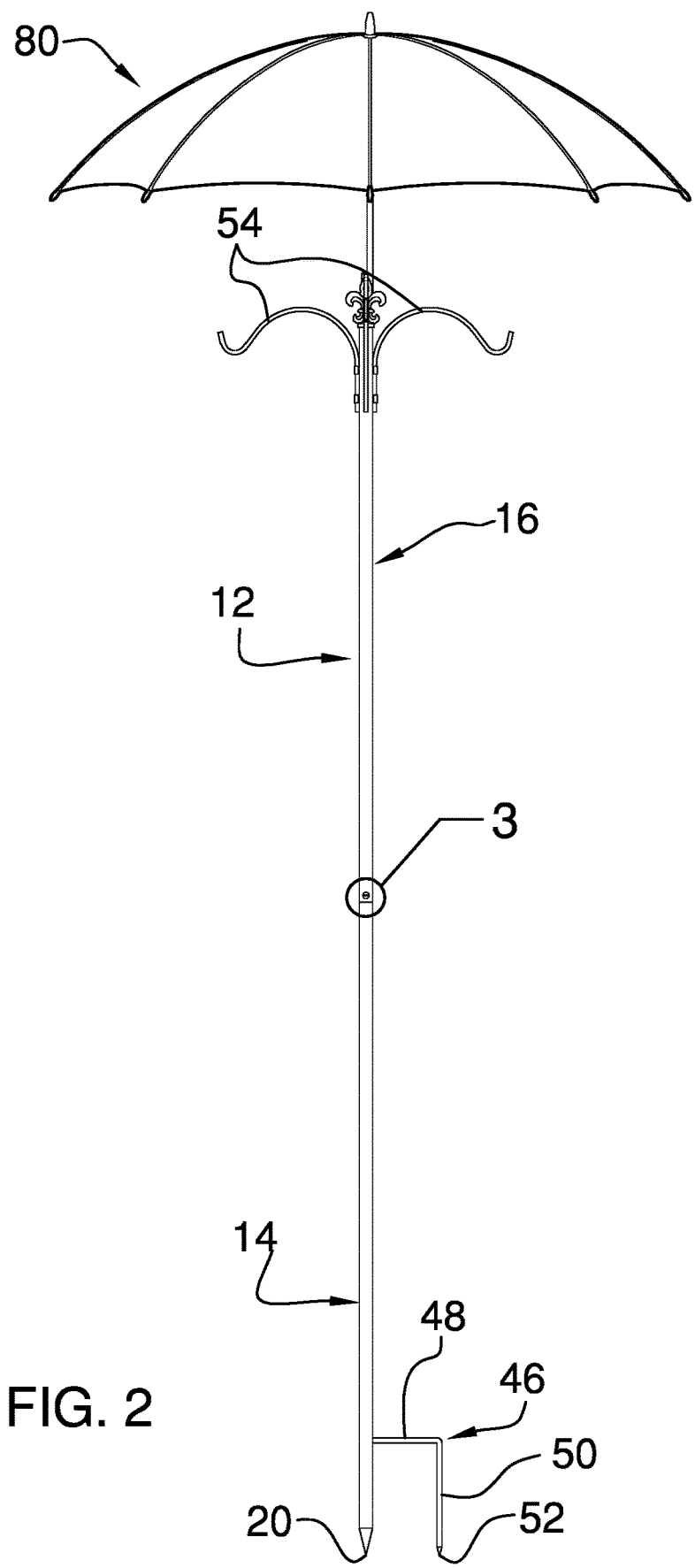
FIG. 2 is a front view of an embodiment of the disclosure.
Figure 3:
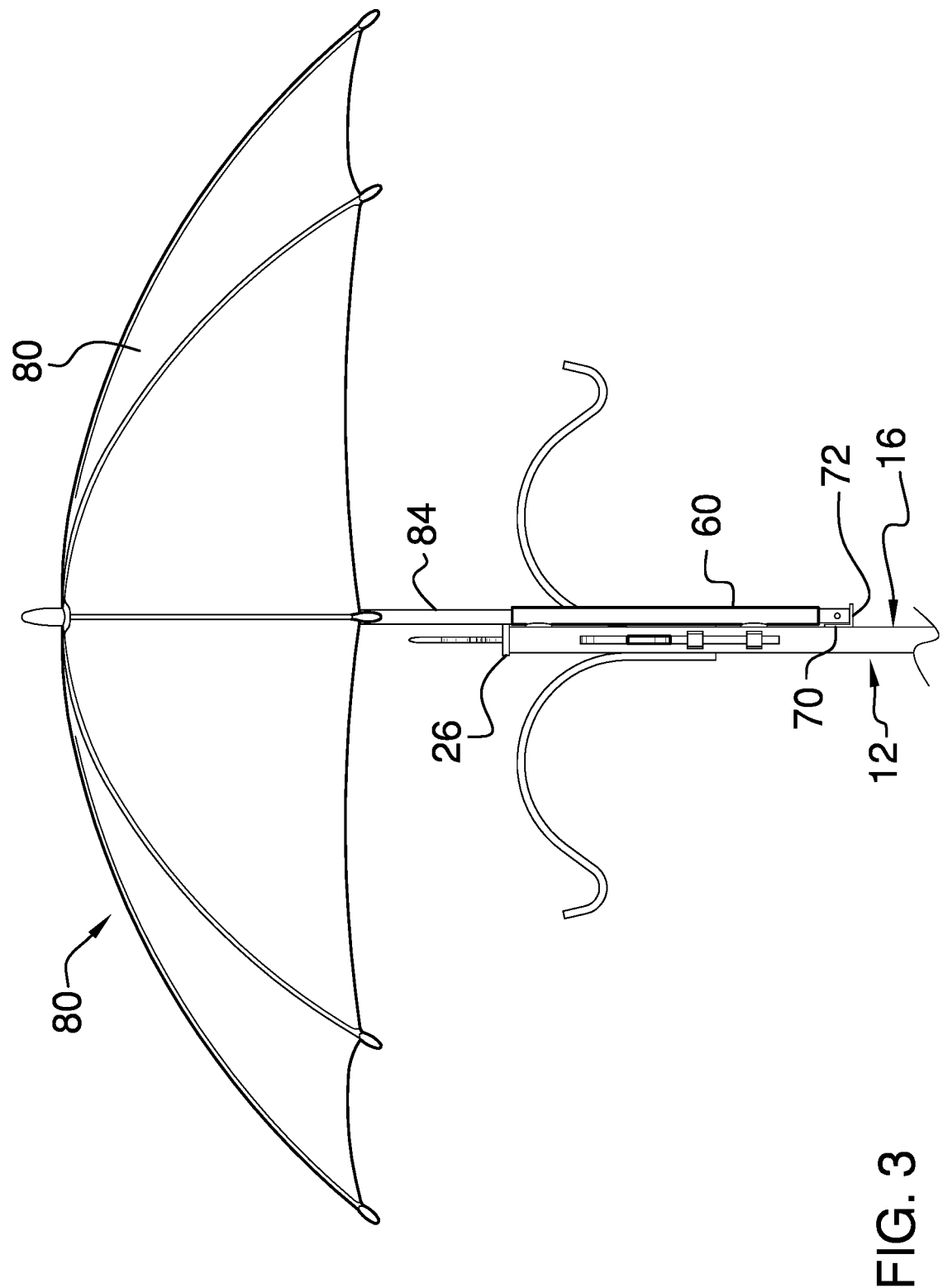
FIG. 3 is a right side view of an embodiment of the disclosure.
Figure 4:
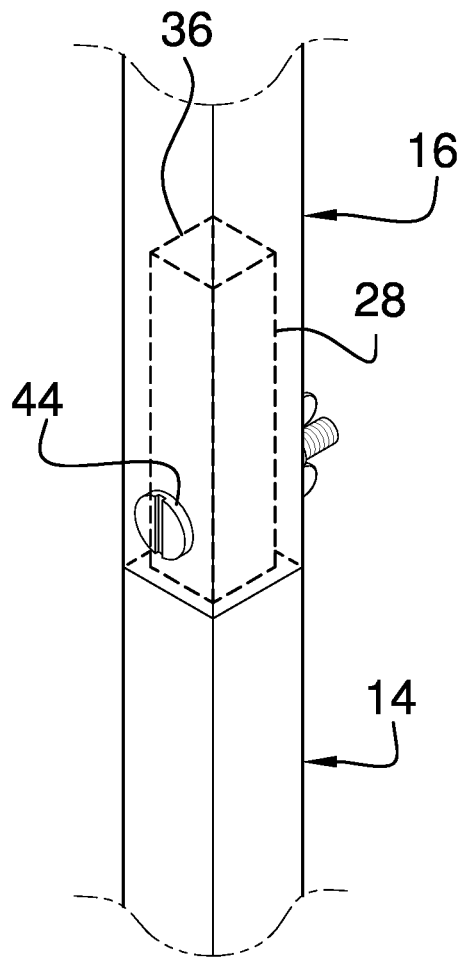
FIG. 4 is a phantom view taken from circle 4 of FIG. 2 of an embodiment of the disclosure.
Figure 5:
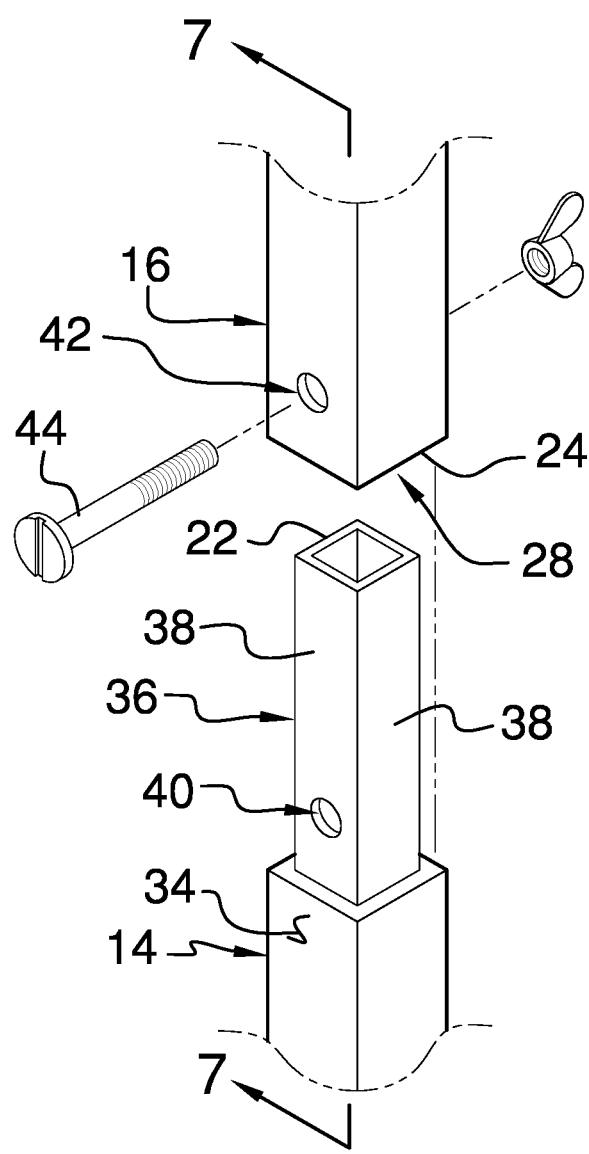
FIG. 5 is an exploded view taken from circle 4 of FIG. 2 of an embodiment of the disclosure.
Figure 6:
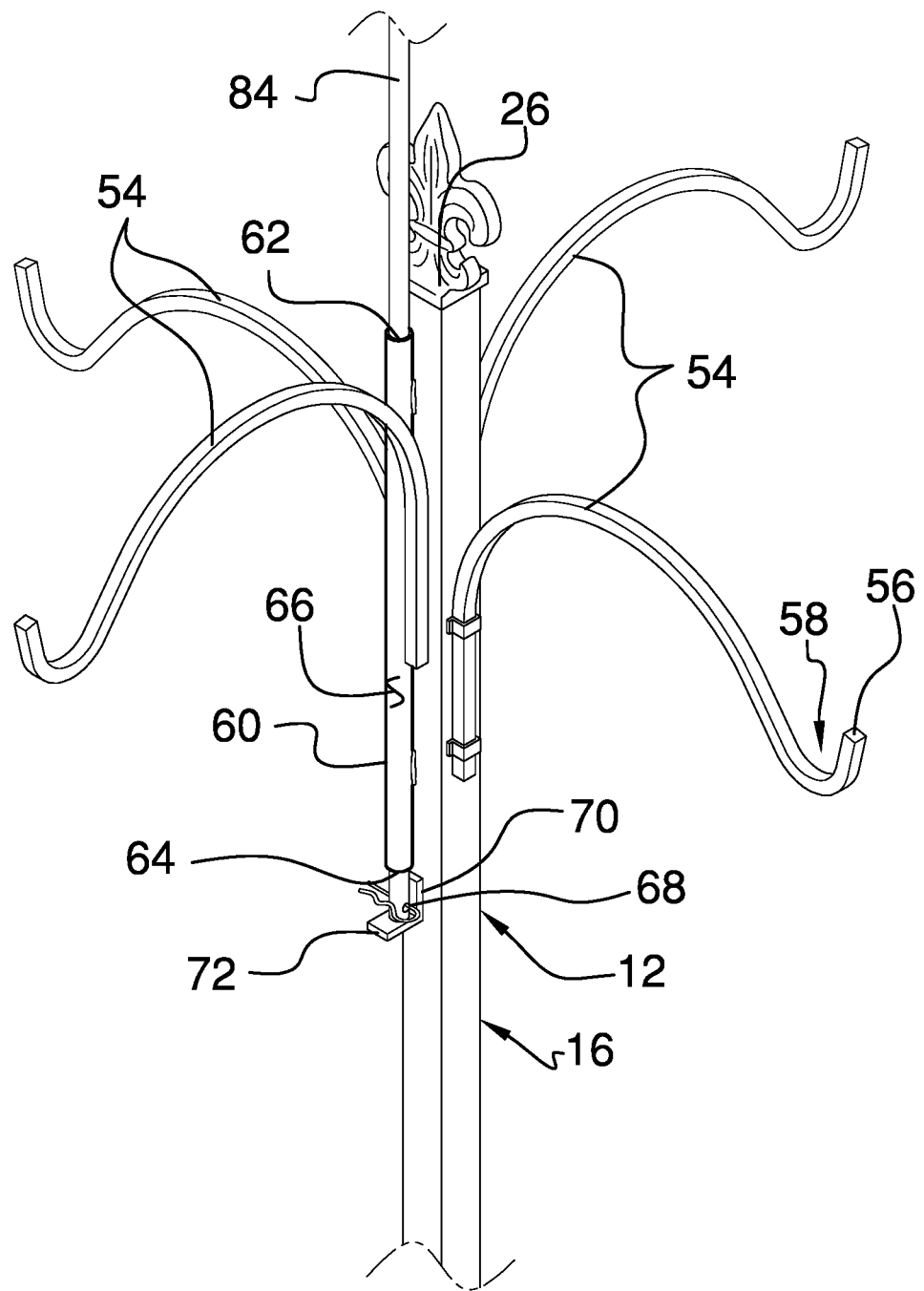
FIG. 6 is a perspective view of a plurality of hooks and a sleeve of an embodiment of the disclosure.
Figure 7:
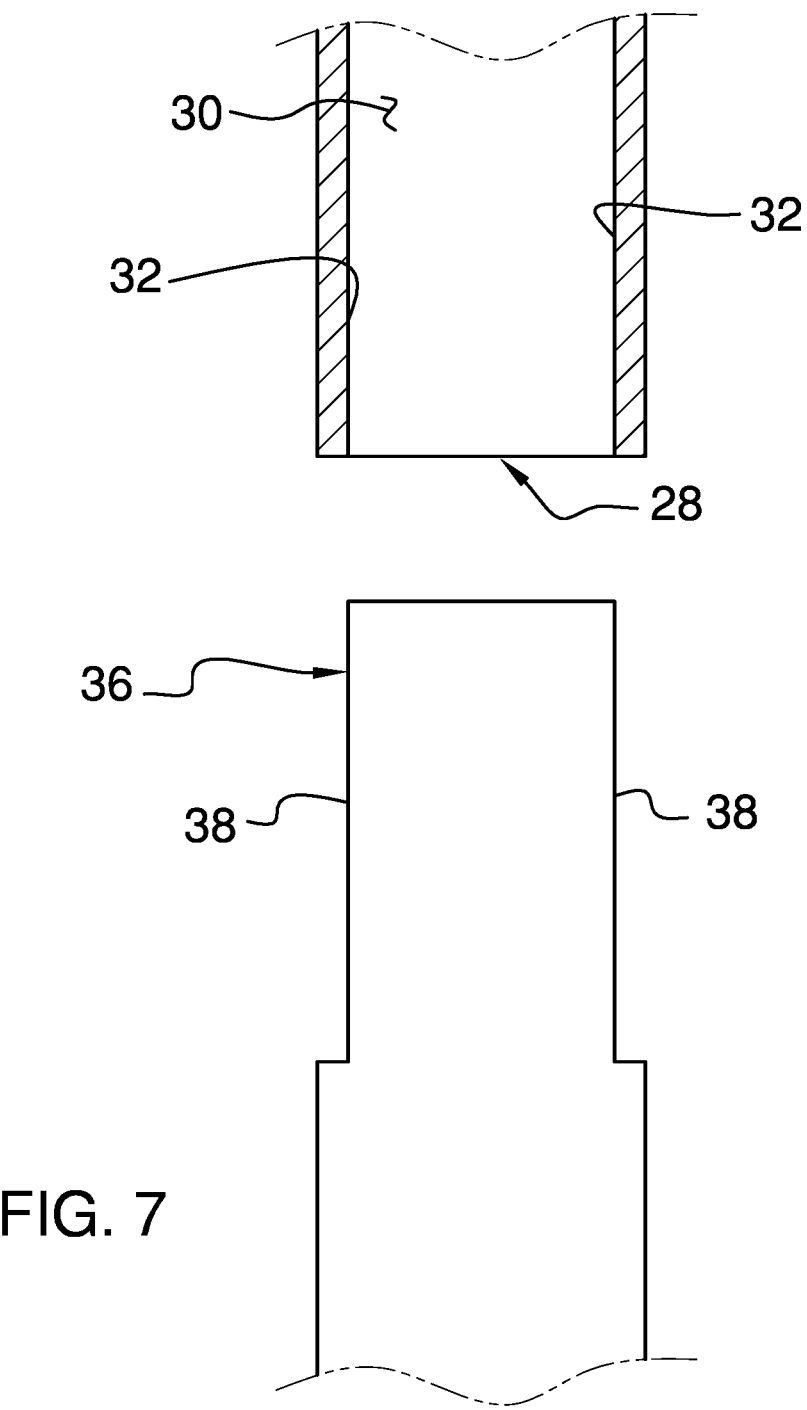
FIG. 7 is a cross sectional view taken along line 7-7 of FIG. 5 of an embodiment of the disclosure.

With reference now to the drawings, and in particular to FIGS. 1 through 7 thereof, a new umbrella device embodying the principles and concepts of an embodiment of the disclosure and generally designated by the reference numeral 10 will be described.

As best illustrated in FIGS. 1 through 7, the bird feeder umbrella assembly 10 generally comprises a pole 12 that comprises a first portion 14 that slidably engages a second portion 16, and the first portion 14 can be inserted into ground 18. The first portion 14 has a bottom end 20 and a top end 22, and the bottom end 20 tapers to a point to penetrate the ground 18. The second portion 16 has a lower end 24 and an upper end 26, and the lower end 24 has a well 28 extending toward the upper end 26. The well 28 has a bounding surface 30 and the bounding surface 30 has a plurality of intersecting sides 32 such that the bounding surface 30 defines a rectangular shape.

The first portion 14 has an outer surface 34, and the outer surface 34 has a coupling section 36 extending from the top end 22 toward the bottom end 20. The coupling section 36 has a plurality of intersecting sides 38 such that the coupling section 36 has a rectangular shape. Moreover, the coupling section 36 has a length and a width that is less than interior dimensions of the well 28 in the lower end 24 of the second portion 28. Thus, as is most clearly shown in FIGS. 4 and 5, the well 28 insertably receives the coupling section 36 such that the second portion 16 is inhibited from rotating on the first portion 14. The coupling section 36 has a hole 40 extending therethrough and the hole 40 extends along a perpendicular axis with respect to an axis extending through the top end 22 and the bottom end 20 of the first portion 14. The second portion 16 has an opening 42 extending therethrough and the opening 42 intersects the well 28. Additionally, the opening 42 is aligned with the hole 40 when the coupling section 36 is inserted into the well 28.

A bolt 44 is insertable through the opening 42 in the second portion 16 and the hole 40 in the coupling section 36 when the coupling section 36 is inserted into the well 28. In this way the bolt 44 inhibits the second portion 16 from being removed from the first portion 14. The bolt 44 may be secured with a nut threaded onto the bolt 44. A support foot 46 is coupled to the pole 12 and the support foot 46 engages the ground 18 for retaining the pole 12 in a vertical orientation. The support foot 46 has a primary portion 48 extending laterally away from the outer surface 34 of the first portion 14 of the pole 12. Additionally, the support foot 46 has a secondary portion 50 extending downwardly from the primary portion 48. The secondary portion 50 has a distal end 52, the distal end 52 tapers to a point and the distal end 52 is aligned with the bottom end 20 of the first portion 14 to penetrate the ground 18 when the bottom end 20 penetrates the ground 18.

A plurality of hooks 54 is provided and each of the hooks 54 is coupled to and extends laterally away from the pole 12. The hooks 54 are spaced apart from each other and are distributed around the second portion 16 of the pole 12. Each of the hooks 54 extends upwardly along an outer surface 34 of the second portion 16 and each of the hooks 54 curves away from the outer surface 34. Each of the hooks 54 has a distal end 56 with respect to the outer surface 34 and each of the hooks 54 has a support curve 58 that is positioned adjacent to the distal end 56. Thus, the distal end 56 of each hook 54 is directed upwardly thereby facilitating the support curve 58 to have an object suspended therefrom without sliding off of the hook 54. Each of the hooks 54 is positioned adjacent to the upper end 26 of the second portion 16.

A sleeve 60 is coupled to the pole 12 and the sleeve 60 is oriented to be aligned with the pole 12. The sleeve 60 has a first end 62, a second end 64 and an outside surface 66 extending therebetween, and the outside surface 66 is bonded to the outer surface 34 of the second portion 16 of the pole 12. Additionally, the sleeve 60 is positioned adjacent to the upper end 26 of the second portion 16. A support 68 is coupled to and extends away from the pole 12, and the support 68 is positioned beneath the sleeve 60. The support 68 comprises a leg 70 that is bonded to the outer surface 34 of the second portion 16. Additionally, the support 68 comprises a foot 72 extending away from the leg 70 and the foot 72 is spaced from the second end 64 of the sleeve 60.

A bird feeder 74 is provided and the bird feeder 74 can be removably suspended from a respective one of the hooks 54 to be accessible to birds. The bird feeder 74 includes a plurality of feed ports 76 exposing bird seed 78 contained in the bird feeder 74. In this way each of the feed ports 76 facilitates birds to eat the bird seed 78. The bird feeder 74 may be a bird feeder of any conventional design that is typically hung from a support. Additionally, the bird feeder 74 can be filled with any type of bird seed 78.

An umbrella 80 is provided that includes a canopy 82 and a rod 84. The rod 84 is insertable into the sleeve 60 having the canopy 82 extending over each of the hooks 54. In this way the umbrella 80 can protect the bird feeder 74 from precipitation thereby inhibiting the bird seed 78 from getting wet. Thus, the umbrella 80 eliminates the problems associated with bird seed getting plugged in bird feeders as the result of the bird seed getting wet. The rod 84 is insertable into the first end 62 of the sleeve 60 until the rod 84 rests on the foot of the support 68 thereby retaining the canopy 82 above the pole 12 and the plurality of hooks 54. The canopy 82 additionally shades the bird feeder 74 from sun thereby protecting the bird feeder 74 from ultraviolet radiation of the sun.

In use, the pole 12 is positioned in the ground 18 such that the pole 12 is vertically oriented. The bird feeder 74 is suspended from a selected one of the hooks 54 and the rod 84 of the umbrella 80 is inserted into the sleeve 60. In this way the bird feeder 74 is protected from precipitation thereby ensuring that the bird seed 78 in the bird feeder 74 stays dry. Thus, the bird seed 78 is inhibited from clumping together and getting stuck in the bird feeder 74 as is common when the bird seed 78 gets wet. Additionally, the bird feeder 74 is shaded from sunlight to inhibit damage from ultraviolet radiation of the sun.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bird feeder umbrella assembly for protecting a bird feeder from precipitation, said assembly comprising:
   a pole comprising a first portion slidably engaging a second portion wherein said first portion is configured to be inserted into ground, said first portion having a bottom end and a top end, said bottom end tapering to a point wherein said bottom end is configured to penetrate the ground, said second portion having a lower end and an upper end, said lower end having a well extending toward said upper end, said well having a bounding surface, said bounding surface having a plurality of intersecting sides such that said bounding surface defines a rectangular shape, said first portion having an outer surface, said outer surface having a coupling section extending from said top end toward said bottom end, said coupling section having a plurality of intersecting sides such that said coupling section has a rectangular shape, said well in said lower end of said second portion insertably receiving said coupling section such that said second portion is inhibited from rotating on said first portion, said coupling section having a hole extending therethrough, said hole extending along a perpendicular axis with respect to an axis extending through said top end and said bottom end of said first portion, said second portion having an opening extending therethrough, said opening intersecting said well, said opening being aligned with said hole when said coupling section is inserted into said well;

a bolt being insertable through said opening in said second portion and said hole in said coupling section when said coupling section is inserted into said well for inhibiting said second portion from being removed from said first portion;

a support foot being coupled to said pole wherein said support foot is configured to engage the ground for retaining said pole in a vertical orientation, said support foot having a primary portion extending laterally away from said outer surface of said first portion of said pole, said support foot having a secondary portion extending downwardly from said primary portion, said secondary portion having a distal end, said distal end tapering to a point, said distal end being aligned with said bottom end of said first portion wherein said distal end is configured to penetrate the ground when said bottom end penetrates the ground;

a plurality of hooks, each of said hooks being coupled to and extending laterally away from said pole, said hooks being spaced apart from each other and being distributed around said second portion of said pole, each of said hooks extending upwardly along an outer surface of said second portion, each of said hooks curving away from said outer surface, each of said hooks having a distal end with respect to said outer surface, each of said hooks having a support curve being positioned adjacent to said distal end such that said distal end is directed upwardly wherein said support curve is configured to have an object suspended therefrom, each of said hooks being positioned adjacent to said upper end of said second portion;

a sleeve being coupled to said pole, said sleeve being oriented to be aligned with said pole, said sleeve having a first end, a second end and an outside surface extending therebetween, said outside surface being bonded to said outer surface of said second portion of said pole, said sleeve being positioned adjacent to said upper end of said second portion;

a support being coupled to and extending away from said pole, said support being positioned beneath said sleeve, said support comprising a leg being bonded to said outer surface of said second portion, said support comprising a foot extending away from said leg, said foot being spaced from said second end of said sleeve;

a bird feeder being removably suspended from a respective one of said hooks wherein said bird feeder is configured to be accessible to birds, said bird feeder including a plurality of feed ports exposing bird seed contained in said bird feeder wherein each of said feed ports is configured to facilitate birds to eat the bird seed; and an umbrella including a canopy and a rod, said rod being insertable into said sleeve having said canopy extending over each of said hooks wherein said umbrella is configured to protect the bird feeder from precipitation thereby inhibiting the bird feed from getting wet, said rod being insertable into said first end of said sleeve until said rod rests on said foot of said support thereby retaining said canopy above said pole and said plurality of hooks.

* * * * *